United States Patent [19]
Köbbing et al.

[11] Patent Number: 4,797,548
[45] Date of Patent: Jan. 10, 1989

[54] REFLECTION LIGHT BEARER SYSTEM WITH SELF-TESTING FEATURE

[75] Inventors: Heinz Köbbing, Dortmund; Hermann Gebhard, Castrop-Rauxel, both of Fed. Rep. of Germany

[73] Assignee: Fraunhofer Gesellschaft zur Förderung der angewandten Forschung e.V., Munich, Fed. Rep. of Germany

[21] Appl. No.: 91,860

[22] Filed: Sep. 1, 1987

[30] Foreign Application Priority Data

Sep. 1, 1986 [DE] Fed. Rep. of Germany ....... 3629715

[51] Int. Cl.[4] .......................... G01V 9/04; G06M 7/00
[52] U.S. Cl. ................................ 250/221; 250/222.1; 340/555; 340/556
[58] Field of Search .................... 250/221, 222.1, 574, 250/575; 340/555, 556, 557, 630

[56] References Cited

U.S. PATENT DOCUMENTS

| | | | |
|---|---|---|---|
| 4,017,193 | 4/1977 | Loiterman | 340/630 |
| 4,647,785 | 3/1987 | Morita | 250/574 |
| 4,695,734 | 9/1987 | Honma et al. | 340/630 |

Primary Examiner—David C. Nelms
Assistant Examiner—William L. Oen
Attorney, Agent, or Firm—Barnes & Thornburg

[57] ABSTRACT

A reflection light barrier with a measuring light emitter which emits light into a space to be monitored, and with a measuring light receiver which receives light reflected from an object present in the space to be monitored. The reflection light barrier, also referred to as light sensor, according to this invention is characterized in that at least one further light receiver is provided which receives the light of the measuring light emitter without reflection, and at least one further light emitter is provided which emits light in a test cycle that is received without reflection by the measuring light receiver. Improper operating conditions can be recognized and indicated thereby.

20 Claims, 7 Drawing Sheets (PULSE DIAGRAM WITH TROUBLE-FREE OPERATION)

(PULSE DIAGRAM WITH FAILURE OF RECEIVER E1)

(PULSE DIAGRAM WITH FAILURE OF EMITTER S1)

(PULSE DIAGRAM WITH PERMANENT LIGHT (EXTRANEOUS LIGHT) AT E2)

REFLECTION LIGHT BEARER SYSTEM WITH SELF-TESTING FEATURE

BACKGROUND AND SUMMARY OF THE INVENTION

The present invention relates to a self-monitoring reflection light barrier with a measuring light emitter that emits light into a space to be monitored, and with a measuring light receiver which receives light reflected from an object disposed in the space to be monitored.

Reflection light barriers of the aforementioned type which are also designated as light sensors, are used, for example, for the recognition of objects, the monitoring of spaces, as collision protection for self-propelling vehicles, etc.

However, the prior art reflection light barriers and light sensors entail the disadvantage that a failure of the light barrier or light sensor cannot be readily distinguished from the normal operating condition because both during the failure of the light sensor as also when no object is being recognized, no signal occurs.

The present invention is therefore concerned with the task to so further develop a reflection light barrier (light sensor) with a measuring light emitter and a measuring light receiver of the type described above that a failure can be recognized with certainty.

The underlying problems are solved according to the present invention in that a further light receiver is provided which receives the light of the measuring light emitter without reflection and at least one further light emitter is provided which emits light in a test cycle which is received by the measuring light receiver without reflection.

According to the present invention, a further light receiver and a further light emitter are thus provided. The further light emitter receives the light of the measuring light emitter without the need that the light has to be reflected at an object. It is thus possible on the basis of the output signal of the further light receiver to examine whether the measuring light emitter emits light.

The further light emitter emits light in a test cycle which is being received by the measuring light receiver without reflection. It is possible by this test cycle to examine the measuring light receiver for a completely satisfactory functioning, i.e., it can be recognized whether it produces with an impinging light a corresponding output signal.

According to another feature of the present invention, a beam splitter plate is used which deflects the light of the measuring light emitter into the space to be monitored and which reflects the light reflected from the monitored space onto the measuring light receiver. "Behind" the beam splitter plate the further light emitter and the further light receiver are so arranged that they receive the light of the measuring light emitter passing through the beam splitter plate, respectively, the measuring light receiver receives the light of the further light emitter passing through the beam splitter plate. This arrangement offers a number of advantages:

On the one hand, it permits the construction of a compact reflection light barrier. On the other, it enables—as will be explained more fully hereinafter—a self-test function of the reflection light barrier which permits not only a recognition of a failure but additionally also an error coordination.

For example, with an arrangement in which the measuring light emitter and the measuring light receiver are arranged in front of the beam splitter plate adjacent one another in such a manner that the beam splitter plate deflects the light emitted from the measuring light emitter into the space to be monitored, respectively, deflects the light coming from the space to be measured onto the measuring light receiver, it becomes possible to provide a third light receiver which receives the light of the further light emitter reflected from the back side of the beam splitter plate. With an appropriate geometric construction, this light receiver can also additionally receive the light reflected from an object and therewith enables a further monitoring of the light receiver.

It is particularly advantageous in every case if the reflection light barrier according to the present invention includes an electronic control circuit which permits not only a read-out of the output signals of the measuring light receiver but which therebeyond can also carry out a self-test.

It is thereby particularly advantageous if the electronic control circuit, in addition to the measuring cycle, properly speaking, carries out a self-test cycle during which the function of the measuring light emitter and the function of the measuring light receiver are examined, as well as a so-called dark test, during which is examined whether outside light impinges on the individual receivers.

BRIEF DESCRIPTION OF THE DRAWINGS

These and other objects, features and advantages of the present invention will become more apparent from the following drawing which shows, for purposes of illustration only, several embodiments in accordance with the present invention, and wherein.

DETAILED DESCRIPTION OF THE DRAWINGS

Figure 1:
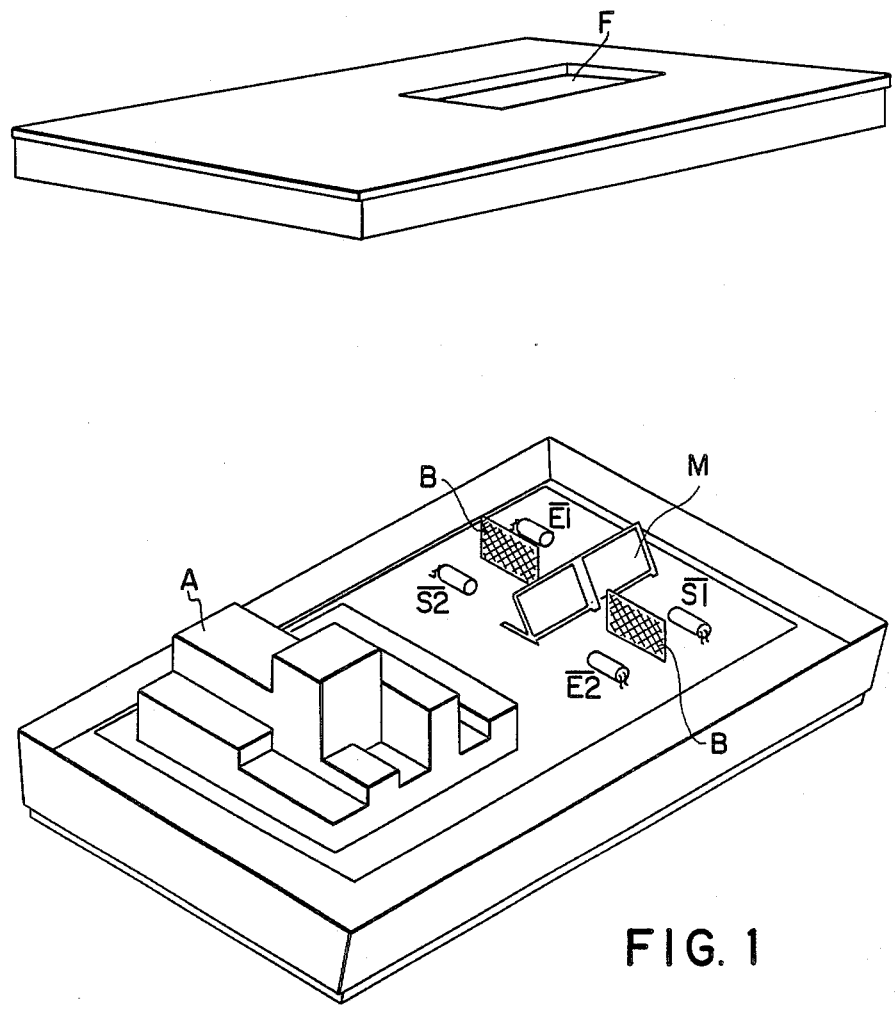
FIG. 1 is a schematic perspective view of a first embodiment in accordance with the present invention.
Figures 2A, 2B:
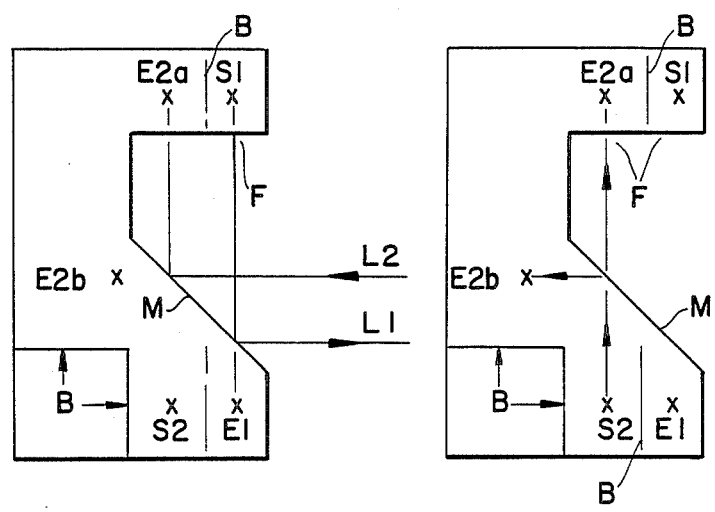
FIG. 2A is a schematic view of a second embodiment in accordance with the present invention in the measuring cycle.
FIG. 2B is a schematic view of the second embodiment in accordance with the present invention in the test cycle.
Figure 3A:
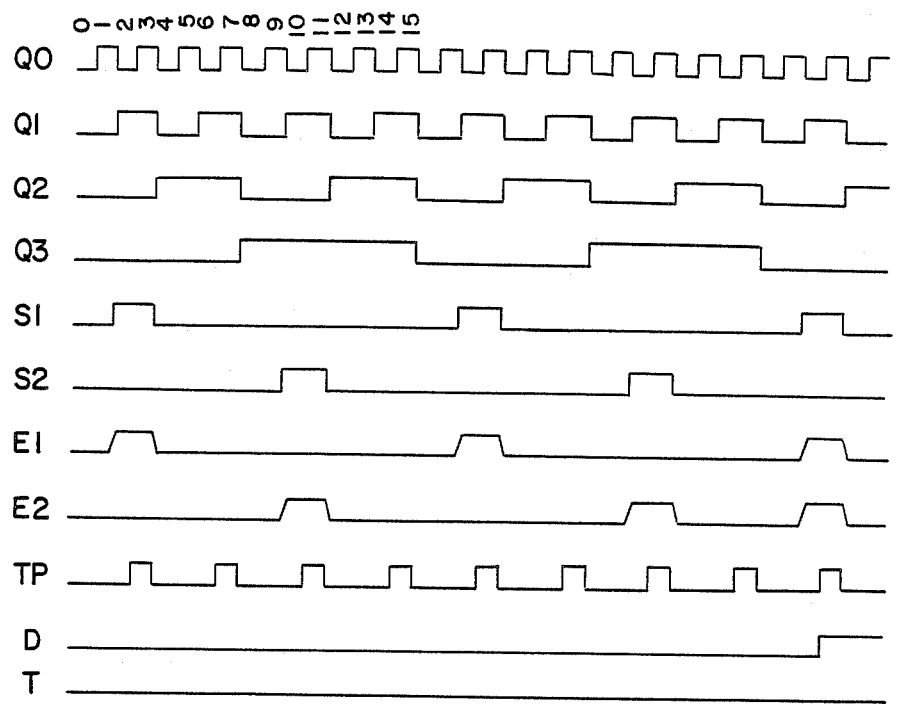
FIGS. 3A–3D are pulse diagrams explaining the operation of the reflection light barrier in accordance with the present invention.
Figure 3B:
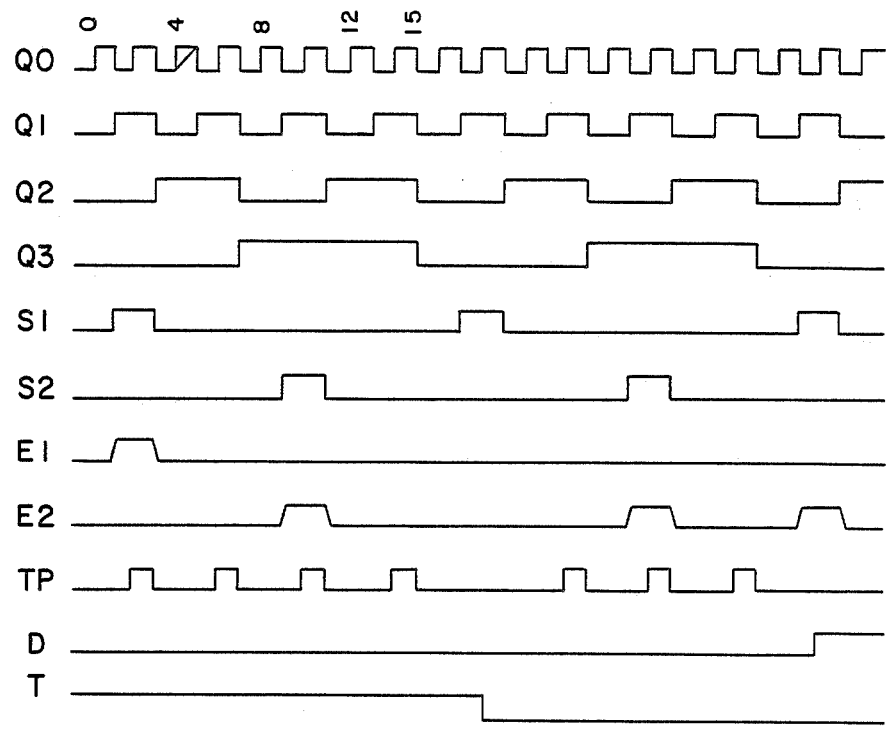
Figure 3C:
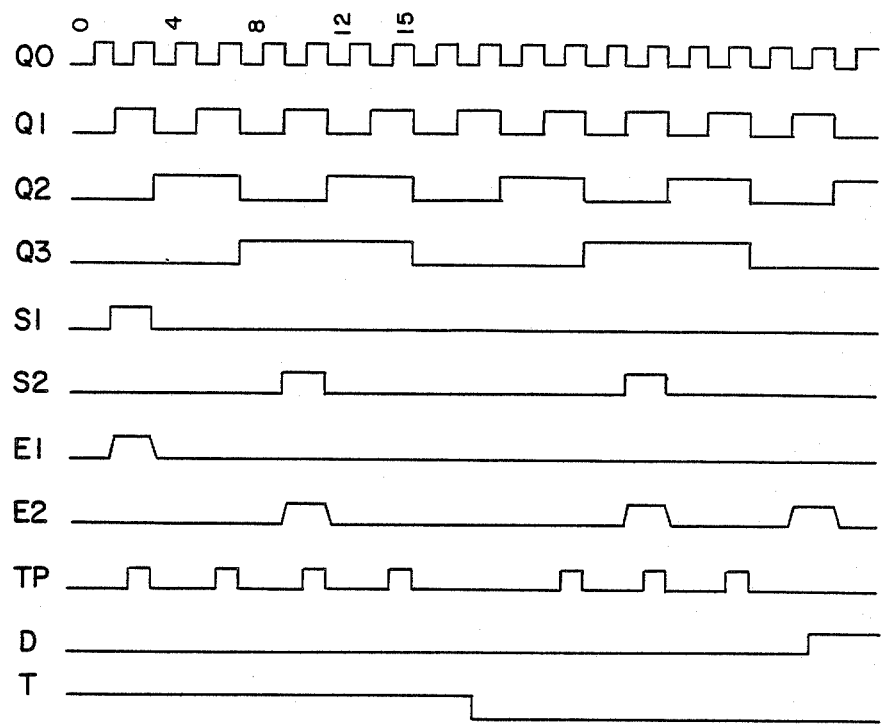
Figure 3D:
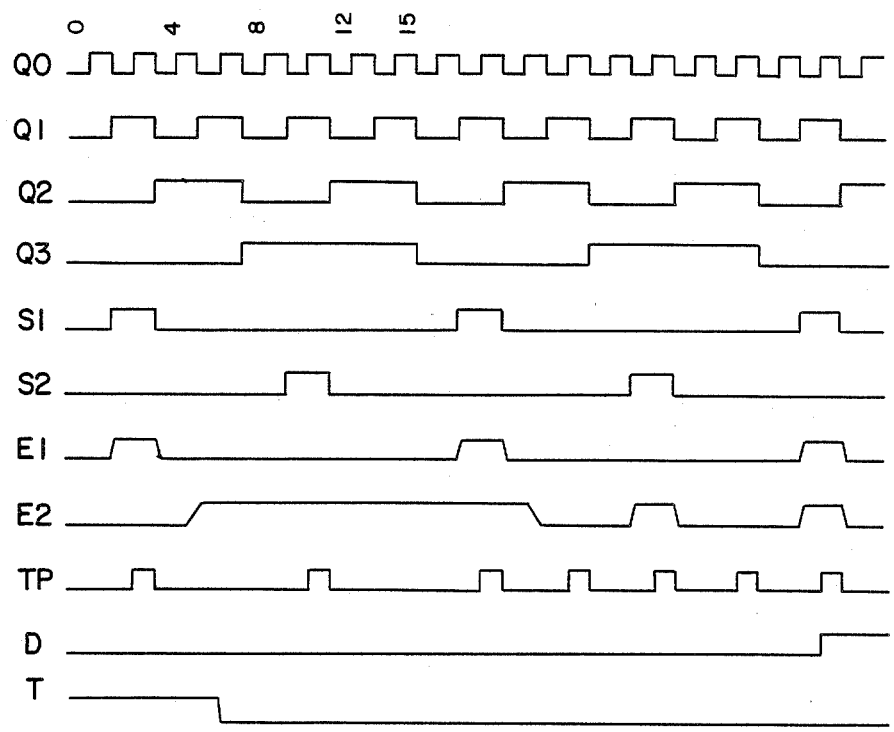

Referring now to the drawing wherein like reference numerals are used throughout the various views to designate like parts, embodiments of a reflection light barrier, respectively, light sensor in accordance with the present invention are illustrated in FIGS. 1 and 2 whereby reference character S generally designates light emitters which in the illustrated embodiments are light diodes operating in the infrared range, and reference character E generally designate light receivers, for example, photodiodes.

The light emitter S1 is the measuring light emitter which emits light L1 by way of a mirror M into a space to be monitored. The light L2 reflected from an object disposed in the space to be monitored is also reflected at the mirror M and is received by a measuring light receiver E2 in the embodiment illustrated in FIG. 1, respectively, by a measuring light receiver E2a in the embodiment illustrated in FIG. 2.

With a light sensor that includes in a known manner only a measuring light emitter and a measuring light receiver, an operating condition which is caused by a failure of the emitter and/or receiver, cannot be distinguished from the operating condition during which no object is located in the space to be monitored. This means that such prior art light sensors are not inherently safe and therewith cannot be used, for example, as contactlessly operating protective installation for self-driving vehicles.

At least one further light receiver E1 is therefore provided which receives the light of the measuring light emitter S1 without reflection at an object located in the space to be monitored, and at least a further light emitter S2 is provided which emits light in a test cycle that is being received by the measuring light receiver E2, respectively, E2a, without the need that a reflection is necessary at an object. For that purpose, the mirror M is constructed as partially transparent mirror which is arranged at a 45° angle to the connecting line of the light emitter/receiver E1/S1, respectively, E2/S2.

Therebeyond, in the embodiment illustrated in FIG. 2, a third light receiver E2b is provided which receives the light of the light emitter S2 reflected at the back side of the mirror M, respectively, the light passing through the partially transparent mirror M which is reflected by an object present in the space to be monitored.

Furthermore, outlet, respectively, inlet windows for the light are designated in FIGS. 1 and 2 by reference character F and shutters for diaphragms by reference character B which prevent that the different emitters and receivers interfere.

In order to be able to coordinate unequivocally the individual signals, the individual emitters are activated in sequential "time windows" to be referred to hereinafter also as evaluating windows, by an evaluation electronic device A only schematically illustrated in the drawing. This manner of operation for the embodiment illustrated in FIG. 2 will be explained more fully hereinafter by reference to FIG. 3. The manner of operation of the embodiment illustrated in FIG. 1 is similar with the exception that no third receiver E2b is present.

In the first of four evaluating windows, the light emitter, respectively, the light diode S1 lights up; a part of the beam must thereby impinge on the receiver E1 through the mirror M which may be a beam splitter plate or a mirror with a smaller hole, respectively, a free center zone. If this is not the case, then either S1 or E1 is defective or the beam splitter M is defective or soiled.

An eventual reflection of the beam at an object present in the space to be monitored will be recognized by way of the receiver E2a within this evaluating window. For that reason, the first evaluating window can also be designated as measuring cycle.

In the second evaluating window, a dark test is carried out, i.e., it will be examined whether with a turned-off emitter no signal occurs at the receivers. Failures of the receivers or foreign light influences can be recognized thereby.

In the third evaluating window, the light diode S2 beams onto the receiver E2b, respectively, through the beam splitter onto the receiver E2a. If this is not the case, then either S2, E2a or E2b are defective or the beam splitter M is defective, soiled or missing. S2, E1, E2a, E2b and the beam splitter M are tested therewith.

The receiver E1 must not recognize a signal during this cycle because it is otherwise defective or illuminated by an outside light source.

In the fourth evaluating window, the dark test is again carried out as in the second evaluating window.

The signals received at E1 and at E2a/b are linked together by way of a logic circuit. Three input signals are produced thereby. A pulse is produced at the output TP (test pulse) every time when the self-test has produced a completely satisfactory functioning of the sensor. If this output behaves statically (for example, in case of line interruptions) or pulses are missing, an error function of the sensor is present. An inherent protection against malfunctioning of the electronic part of the sensor is realized thereby.

If an error function of the sensor is recognized, then additionally the output T (test) is set to low-level. This condition can only be cancelled by an external reset command.

The signal at the output D (data) indicates whether a reflection of the beam was or was not recognized. It is actualized every time in the evaluating window 1.

The program of the measuring operation is controlled by a four-bit counter. All possible internal system conditions are run through and tested sequentially thereby. The evaluation takes place only at certain points in time when all relevant signals exist in a stable manner. This is the case at the counter conditions 3, 7, 11 and 15.

The signal E2 thereby results from a logic AND-linking of the receiver signals E2a and E2b. The missing of the beam splitter can also be recognized by this measure. Furthermore, a higher emission power and therewith a greater sensing distance can be achieved by the pulse operation of the infrared emitter.

The signals at the two outputs TP and D result from the following table:

(S1, S2 = emitted signals; E1, E2 = received signals, TP = test output, D = data output (0 during interruption of the beam))

| S1 | S2 | E1 | E2 | TP | D(new) | |
|---|---|---|---|---|---|---|
| 1 | 0 | 0 | x | 0 | x | Window 1 |
|   |   | 1 | 0 | 1 | 0 | |
|   |   | 1 | 1 | 1 | 1 | |
| 0 | 0 | 1 | x | 0 | D | Windows 2, 4 |
|   |   | x | 1 | 0 | D | (Dark Test) |
|   |   | 0 | 0 | 1 | D | |
| 0 | 1 | 0 | 0 | 0 | D | Window 3 |
|   |   | 0 | 1 | 1 | D | |
|   |   | 1 | x | 0 | 0 | |

All other conditions lead to TP=0 and therewith to an absence of pulses at TP.

The following table reproduces the production and illustration of the system conditions and of the output TP during proper functioning of the light sensor:

| Condition | Q3 | Q2 | Q1 | Q0 | S1 | S2 | E1 | E2 | TP | |
|---|---|---|---|---|---|---|---|---|---|---|
| 0 | 0 | 0 | 0 | 0 | 0 | 0 | 0 | 0 | 0 | |
| 1 | 0 | 0 | 0 | 1 | 0 | 0 | 0 | 0 | 0 | |
| 2 | 0 | 0 | 1 | 0 | 1 | 0 | 1 | 0 | 0 | |
| 3 | 0 | 0 | 1 | 1 | 1 | 0 | 1 | 0 | 1 | 1. Evaluation |
| 4 | 0 | 1 | 0 | 0 | 0 | 0 | 0 | 0 | 0 | |
| 5 | 0 | 1 | 0 | 1 | 0 | 0 | 0 | 0 | 0 | |
| 6 | 0 | 1 | 1 | 0 | 0 | 0 | 0 | 0 | 0 | |
| 7 | 0 | 1 | 1 | 1 | 0 | 0 | 0 | 0 | 1 | 2. Evaluation |
| 8 | 1 | 0 | 0 | 0 | 0 | 0 | 0 | 0 | 0 | |
| 9 | 1 | 0 | 0 | 1 | 0 | 0 | 0 | 0 | 0 | |

-continued

| Condition | Q3 | Q2 | Q1 | Q0 | S1 | S2 | E1 | E2 | TP | |
|---|---|---|---|---|---|---|---|---|---|---|
| 10 | 1 | 0 | 1 | 0 | 0 | 1 | 0 | ? | 0 | |
| 11 | 1 | 0 | 1 | 1 | 0 | 1 | 0 | 1 | 1 | 3. Evaluation |
| 12 | 1 | 1 | 0 | 0 | 0 | 0 | 0 | 0 | 0 | |
| 13 | 1 | 1 | 0 | 1 | 0 | 0 | 0 | 0 | 0 | |
| 14 | 1 | 1 | 1 | 0 | 0 | 0 | 0 | 0 | 0 | |
| 15 | 1 | 1 | 1 | 1 | 0 | 0 | 0 | 0 | 1 | 4. Evaluation |

An error function is recognized maximally after three periods of the signal Q0. At, for xample, f(Q0)=1000 Hz, a reaction time of 3 ms will thus result.

The pulse diagrams illustrated in FIGS. 3 A–D illustrate the signal developments under different operating conditions; as these pulse diagrams are readily understandable, a detailed explanation thereof will be dispensed with herein. FIG. 3A: Diagram 1: trouble-free operation FIG. 3B: Diagram 2: trouble case "failure of receiver E1" FIG. 3C: Diagram 3: trouble case "failure of emitter S1" FIG. 3D: Diagram 4: trouble case "extraneous light at receiver E2".

As a construction of the evaluating electronics is possible without difficult on the basis of the functioning description set forth hereinabove, a detailed description of the circuit construction is dispensed with herein as it is readily within the scope of those skilled in the art.

The present invention has been described hereinabove by reference to embodiments, however, without limitation of the general inventive concept—as will follow from the claims. Of course, the different modifications are possible within the scope of this generic inventive concept:

For example, it is possible to design the measuring cycle longer than the other evaluating windows.

In lieu of IR-light diodes, other emitters can also be used as light emitters which operate in another spectral range.

The geometric construction of the light sensor according to the present invention can, of course, differ from the form of the illustrated embodiments.

Furthermore, it is possible to utilize for the evaluating electronics a microprocessor or a single chip microcomputer in lieu of discrete logic components.

The geometric configuration of the light sensor according to the invention may, of course, deviate from the form of the embodiments. For example, it is possible, as schematically illustrated for a third embodiment, to so arrange the measuring light emitter S1 and the light receiver E2 that the measuring light is emitted without reflection, respectively, the light reflected from an object impinges on the receiver E1 without reflection at the beam splitter M. Correspondingly, the light impinging on the receiver E1 is reflected at the beam splitter, respectively, the light of the emitter S2 impinges on the receiver E2 after reflection at the beam splitter M.

Figure 4A:
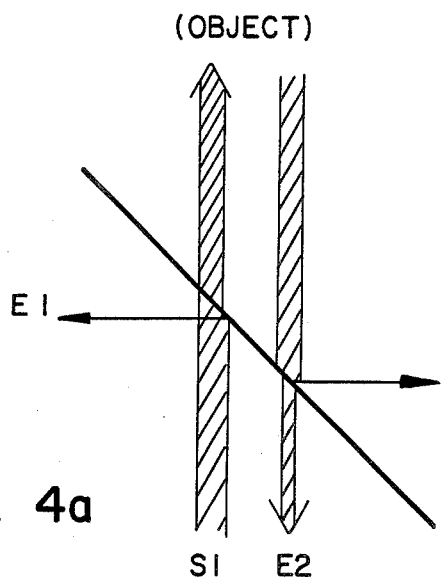
FIGS. 4A and 4B are schematic illustrations of a third embodiment of a measuring and test cycle arrangement in accordance with the present invention.
Figure 4B:
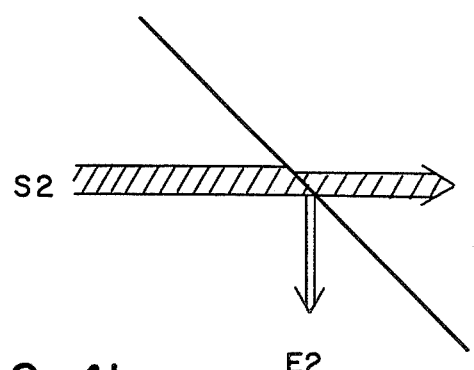

The measuring and test cycle in such an arrangement are schematically illustrated in FIGS. 4A, respectively, 4B.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A reflection light barrier, comprising measuring light emitter means which emits light into a space to be monitored, measuring light receiver means which receives light reflected from an object present in the space to be monitored, at least one further light receiver means which receives the light of the measuring light emitter means without emission into and reflection from said space to be monitored, and at least one further light emitter means which emits light only in a test cycle which light is received by the measuring light receiver means without emission into and reflection from said space to be monitored.

2. A reflection light barrier according to claim 1, further comprising a beam splitter plate means, the measuring light emitter means and the measuring light receiver means being so arranged adjacent one another in front of the beam splitter plate means that the beam splitter plate means deflects the light emitted by the measuring light emitter means into the space to be monitored, respectively deflects the light coming from the space to be monitored onto the measuring light receiver means, the further light emitter means and the further light receiver means being so arranged behind the beam splitter plate means that the further light receiver means receives the light of the measuring light emitter means passing through the beam splitter plate means and the measuring light receiver means receives the light of the further light emitter means passing through the beam splitter plate means.

3. A reflection light barrier according to claim 2, further comprising a third light receiver means which receives the light of the further light emitter means reflected from the back side of the beam splitter plate means.

4. A reflection light barrier according to claim 3, wherein the beam splitter plate means is arranged at an angle of about 45° to the connecting line of the measuring light receiver means, respectively, emitter means with the further emitter means, respectively, the further receiver means.

5. A reflection light barrier according to claim 4, further comprising electronic control circuit means operable to carry out a self-test.

6. A reflection light barrier according to claim 5, wherein the electronic control circuit means is operable to carry out a measuring cycle, a self-test cycle and a dark test.

7. A reflection light barrier according to claim 6, wherein the light emitter means are light diodes operating in the infrared range.

8. A reflection light barrier according to claim 7, wherein the light diodes are operated in pulsed operation.

9. A reflection light barrier according to claim 8, wherein the beam splitter plate means reflects about 70% of the light of the measuring light emitter means.

10. A reflection light barrier according to claim 9, wherein the beam splitter plate means is a mirror in which a small area surrounding the connecting lines of the light emitter and light receiver means is devoid of mirror operation.

11. A reflection light barrier according to claim 2, wherein the beam splitter plate means is arranged at an angle of about 45° to the connecting line of the measuring light receiver means, respectively, emitter means with the further emitter means, respectively, the further receiver means.

12. A reflection light barrier according to claim 1, further comprising an electronic control circuit means operable to carry out a self-test.

13. A reflection light barrier according to claim 12, wherein the electronic control circuit means is operable to carry out a measuring cycle, a self-test cycle and a dark test.

14. A reflection light barrier according to claim 2, wherein the light emitter means are light diodes operating in the infrared range.

15. A reflection light barrier according to claim 14, wherein the light diodes are operated in pulsed operation.

16. A reflection light barrier according to claim 2, wherein the beam splitter plate means reflects about 70% of the light of the measuring light emitter means.

17. A reflection light barrier according to claim 2, wherein the beam splitter plate means is a mirror in which a small area surrounding the connecting lines of the light emitter and light receiver means is devoid of mirror operation.

18. A reflection light barrier according to Claim 1, further comprising a beam splitter plate means which deflects the light of the measuring light emitter means onto the further receiver means and the light of the further light emitter means on the measuring light receiver means.

19. A reflection light barrier, comprising measuring light emitter means for emitting light into a space to be monitored, measuring light receiver means for receiving light reflected from an object present in the space to be monitored, at least one testing light receiver means for receiving the light of the measuring light emitter means without reflection from said space to be monitored, and at least one testing light emitter means for emitting light only in a test cycle which light is received by the measuring light receiver means without reflection from said space to be monitored, and evaluation means for monitoring said measuring light receiver means and testing light receiver means when said measuring light emitter means and said testing light emitter means are emitting and not emitting light.

20. A reflection light barrier according to claim 19, wherein said evaluation means activates said testing light emitter means only and monitors said measuring light receiver means for receipt of light, activates said measuring light emitter means only and monitors said test light receiver means for receipt of light, and deactivates said measuring and said testing light emitter means and monitors said measuring and said testing light receiving means for non receipt of light.

* * * * *